United States Patent [19]

Caris

[11] 4,423,793

[45] Jan. 3, 1984

[54] LOAD CELL OF INTEGRAL UNITARY CONSTRUCTION CONTAINING A SOLID DISC-SHAPED MEASURING SECTION

[75] Inventor: Richard F. Caris, Scottsdale, Ariz.

[73] Assignee: Interface, Inc., Scottsdale, Ariz.

[21] Appl. No.: 314,310

[22] Filed: Oct. 23, 1981

[51] Int. Cl.³ .......................... G01G 3/14; G01L 1/22
[52] U.S. Cl. ................................. 177/211; 73/862.66; 338/5
[58] Field of Search ..................... 177/211; 73/862.65, 73/862.66; 338/5

[56] References Cited

U.S. PATENT DOCUMENTS

| | | | |
|---|---|---|---|
| 2,487,595 | 11/1949 | Ruge | 73/141 |
| 3,136,157 | 6/1964 | Seed et al. | 177/211 X |
| 3,161,046 | 12/1964 | Farley | 177/211 X |
| 3,196,676 | 7/1965 | Pien | 73/141 |
| 3,513,431 | 5/1970 | Kovacs | 338/5 |
| 3,734,216 | 5/1973 | Nordstrom et al. | 177/211 X |
| 3,736,795 | 6/1973 | Anderson | 73/141 A |
| 3,960,013 | 6/1976 | Ormond | 73/141 A |
| 3,969,935 | 7/1976 | Shoberg | 177/211 |
| 4,089,036 | 5/1978 | Geronime | 361/283 |
| 4,162,628 | 7/1979 | Oetjen et al. | 73/141 A |
| 4,260,034 | 4/1981 | Randolph, Jr. | 177/211 |

Primary Examiner—George H. Miller, Jr.
Attorney, Agent, or Firm—Cates & Roediger

[57] ABSTRACT

A load cell of integral unitary construction wherein strain gages are mounted on the peripheral surface of a solid disc-shaped measuring body and are responsive to shear strain induced in the solid measuring body by an applied load. The load receiving and load cell supporting ends are incorporated into the integral unitary structure.

9 Claims, 5 Drawing Figures

LOAD CELL OF INTEGRAL UNITARY CONSTRUCTION CONTAINING A SOLID DISC-SHAPED MEASURING SECTION

BACKGROUND OF THE INVENTION

The use of load cells to measure forces is now widespread in industry. Typically, the load cell includes a stress concentrating structure with electrical strain gages mounted thereon. The type of induced strain that is measured by the load cell is determined primarily by the location and orientation of the gages on the particular structure. For a number of reasons, the measurement of shear strain in a load cell has been recognized as providing a transducer of relatively high sensitivity.

Presently load cells that are responsive to shear strain rely on an adaptation of the standard loaded beam structure to different configurations. The loaded beam structure is characterized by four defined adjacent sides with the forces to be measured being applied at the fixed opposing ends. It is common to utilize this beam structure in end to end configurations to form a hollow shear ring structure. The shear ring is the basis of a number of tubular or hollow center load cells which measure axially applied loads. The electrical strain gages are mounted on the exterior surface of the ring and are oriented at 45 degrees to the direction of the applied load so as to be responsive to the induced shear forces. An alternate form of load cell utilized in measuring axially applied loads employs a number of columns disposed about a hollow core. The columns are oriented parallel to the direction of the applied load. A plurality of spaced columns are utilized in preference to a single column to provide increased resistance to bending moments resulting from off-center and non-parallel loading of the load cell. The ends of the columns are either mechanically connected to or brazed to end caps which serve as the basal and load receiving sections of the load cell.

Both shear ring load cells and columnar load cells are characterized by a plurality of active elements disposed about a central axis so as to provide hollow core. The hollow structure is required in order to define the strain path and insure that the active elements function in the predictable manner of the loaded beam or column.

The use of hollow core configurations tends to limit the capacity of these load cells. Large loads can result in a buckling, warping, or other distortion of the active elements in part due to the internal torque resulting from the relative rotation of internal portions of the hollow structure. In addition to protect against potential destruction of the cell from large static loads and high impact loads, stop mechanisms are often incorporated into the design of the hollow core load cell. The presence of stop mechanisms contained within the hollow core body of the load cell normally requires that access to the hollow central volume be available during the manufacture of the load cell. Such mechanisms are not required if the load cell is used under controlled circumstances but that is not a typical condition.

Further, the structural configuration of the central measuring body containing the active elements generally requires access to a central hollow core in order to accomplish the machining or assembly steps needed for fabrication. The need for access to the load cell interior typically requires that one or more separate end caps be affixed as one of the last steps of assembly. The presence of the junction between the active central elements and the end caps results in the load cell exhibiting hysteresis. A hysteretic effect is undesirable since it adversely affects the accuracy and predictability of the measuring function.

Accordingly, the present invention is directed to a load cell utilizing a single solid active measuring body which is readily made as part of an integral unitary load cell structure. No hollow core is present, the end caps can be made integral with the structure and internal stops are not used. The invention provides a high capacity load cell without exhibiting the hysteresis effects characteristic of cells having discrete or nonintegral cap ends. In addition, the departure from prior load cells relying on loaded beams or columns enables the number of steps in fabrication to be significantly reduced thereby reducing manufacturing cost.

BRIEF DESCRIPTION OF THE INVENTION

This invention is directed to the provision of a load cell for measuring large applied forces and, more particularly, to load cells utilized in weighing platforms adapted to receive substantial loads and containing a plurality of load cells. The present load cell can be formed from a single blank of material to thereby provide a cell of unitary integral construction. This load cell contains a solid central section forming the single active measuring body of the cell. The solid central section is the primary element of the cell and is provided with first and second opposing large area surfaces having a peripheral surface therebetween to accommodate strain gages.

In this device, the active measuring body is centrally located between first and second stress concentrating means. The first and second concentrating means are contained in first and second regions located adjacent to the respective opposing surfaces of the measuring body. A force receiving section, preferably integral with the first stress concentrating means in the preferred embodiment, is adapted to engage a weighing platform or otherwise receive an applied load. A basal section, also preferably integral with the second concentrating means, is utilized for supporting the load cell on a basal surface.

Strain gages are mounted on the peripheral surface of the solid measuring body. The gages are affixed and oriented so as to respond to shear strains induced in the solid measuring body by the transmittal to the first stress concentrating means of a force having a component in the axial direction of the load cell. The electrical resistance of the gages varies in accordance with the load thereby converting the mechanical force to a change in electrical properties that is sensed by an indicating or read-out device.

In manufacture, this load cell can be readily formed as an integral unitary structure from a single blank of material with the stress concentrating means comprising slots or holes therein formed by operations originating from without the load cell blank rather than from within a hollow interior. The central measuring body is solid and extends across the load cell structure in a plane bounded by the stress concentrating means and normal to the axis of the load cell. Thus, a solid core high capacity load cell having a reduced manufacturing cost is provided.

BRIEF DESCRIPTION OF THE DRAWINGS

Further features and advantages of the invention will become more readily apparent from the detailed description of the invention taken in conjuction with the accompanying drawingswherein.

DETAILED DESCRIPTION OF A PREFERRED EMBODIMENT

Figure 1:
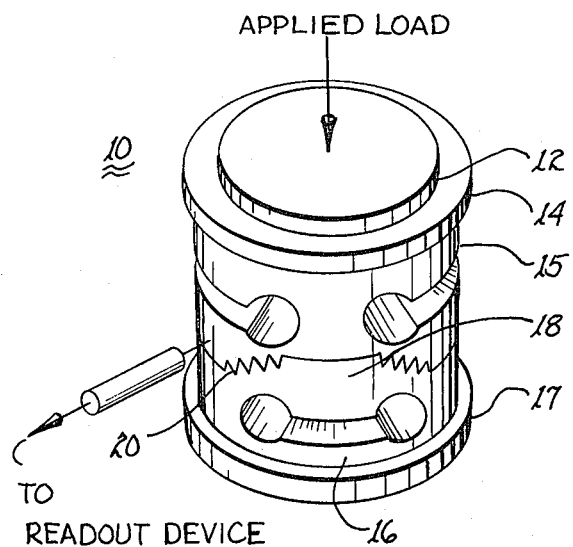
FIG. 1 is a perspective view of one embodiment of the invention.
Figure 2:
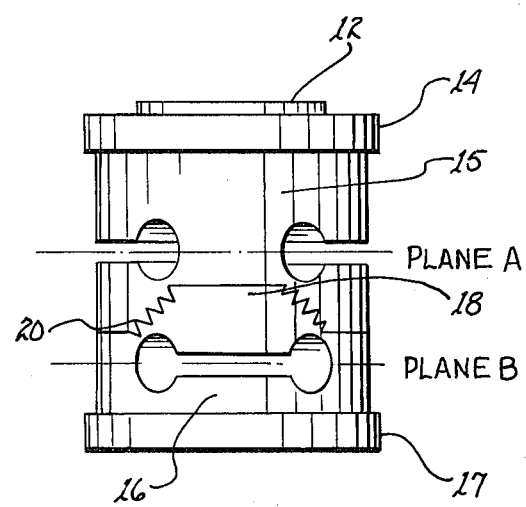
FIG. 2 is a side view of the embodiment shown in FIG. 1.

Referring now to the embodiment of FIGS. 1 and 2, load cell 10 is formed from a cylindrical steel production blank and is shown with the load applied to the upper surface thereof in an axial direction.

The load cell includes a solid central measuring body 18 between planes A and B. The body is disc-shaped with first and second opposing surfaces adjacent to planes A and B respectively and a peripheral surface upon which strain gages 20 are mounted.

Also formed as part of the integral unitary structure in the preferred embodiment is the load receiving section which includes end section 14 and the raised load receiving portion 12 formed thereon. A basal section 17 is formed at the bottom of the load cell for engagement with a supporting surface. The load to be measured is applied to raised portion 12 typically as a point or small area load and is distributed across end cap 14 and the adjacent region of the first stress concentrating section 15. Since the applied load is concentrated within a relatively small area, additional material is provided between plane A and the end cap 14 to obtain distribution of the resultant stress throughout the upper portion of the load cell. The basal section 17 transmits force to the supporting surface (not shown) over a relatively large area so that a smaller volume of material is provided between plane B and basal section 17.

The strain gages 20 are located on the peripheral surface of the central measuring disc. The gages are oriented at 45 degrees to the axis of the load cell to be responsive to shear induced in the disc by the application of the load. Typically, four gages are utilized in the conventional bridge connection and are electrically connected to one of the standard readout or indicating devices commercially available.

Figure 3:
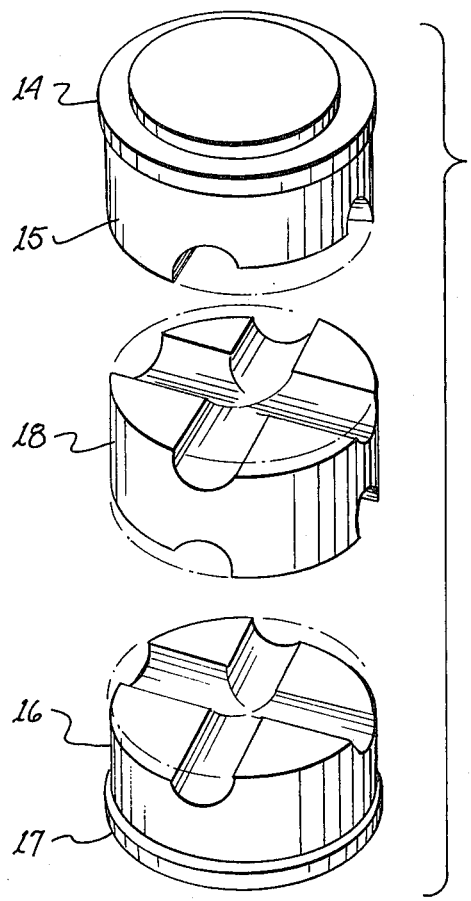
FIG. 3 is an exploded view in perspective of a portion of the embodiment of FIG. 1 showing the stress concentrating means and the central measuring body.

The ease of manufacturing of the present load cell is shown in FIG. 3 wherein the perspective view is expanded at planes A and B of FIG. 2. The fabrication of the central measuring body is accomplished by the drilling of two pairs of holes along the diameters of the block so that they intersect the axis of the cylinder. The holes in each pair are drilled at 90 degrees to each other. Then two slots are formed in each plane to interconnect adjacent holes. The slots in each plane are diametrically positioned and the slots in each plane are rotated 90 degrees with respect to the slots in the other plane. Thus, the formation of the load cell excluding the initial machining to form the integral end caps requires only the drilling of two pairs of holes and the milling of two pairs of slots.

The central measuring body 18 so formed is a solid active disc-shaped element with the adjacent stress concentrating means applying the forces to alternate arcuate segments of the disc. Although the embodiment shown utilizes two arcuate segments on each side of the disc with a 90 degree relative rotation of the segments on one side versus the segments on the opposing side of the disc, additional segments can be provided by additional holes and slots.

The solid disc is a significant departure from prior load cells utilizing multiple active elements, for example loaded beams or columns, in prior hollow core configurations. The hollow core type of load cell relies on the use of active elements characterized by four adjacent surfaces with the loading taking place at the ends. The stress within these elements is substantially uniform throughout the cross-section of the element. The ends of multiple beam structures are typically fixed in a ring-type structure to form the hollow core. One such structure utilizing a shear ring in a hollow core structure is manufactured by Interface, Inc. of Scottsdale, Arizona. This load cell is utilized in determining the lifting weight of oil pumped from a well. The load cell is positioned on the well head equipment so that the sucker rod extends through the hollow core.

The solid single active element load cell which is the subject matter of the present invention is found to have a higher maximum load capacity than hollow core shear ring load cells of equivalent materials and dimensions. In addition, the output response characteristics are found to be more linear than those of hollow core load cells. This is believed to be due to the continuous mass of the solid load cell which reduces outward warping and relative rotation of the elements of a hollow core load cell. The presence of a central mass in the present integral structure is thought to reduce the internal torque generated within hollow core structures by the applied load.

Figure 4A:
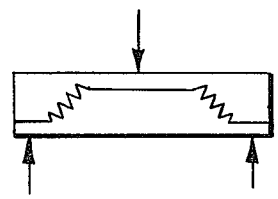
FIG. 4a and 4b are diagrams showing the location of forces and the strain distribution across a portion of the central measuring body.
Figure 4B:
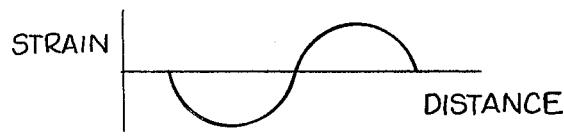

FIGS. 4a and 4b show a general representation of the edge of a disc corresponding to the solid active element of the side view of FIG. 2. The first stress concentrating means results in a force being applied to the middle segment of FIG. 4a. The opposing forces are provided from the second stress concentrating means by way of spaced adjacent arcuate segments from the bottom of the disc. The distribution of the induced strain is shown in FIG. 4b. The strain gages are positioned on the peripheral surface in regions of maximum strain to increase sensitivity of the load cell. While the distribution of forces within the disc is more complex than the forces in a loaded beam or column, the stress is found to be concentrated in the outer regions of the disc thereby increasing the sensitivity of the load cell.

The use of a solid disc permits the present load cell to be fabricated from a single production steel production blank with a relatively few machining steps. The assembly aspect of manufacture is limited to the mounting of the gages since the end caps are part of the integral unitary device. The solid structure provides a rugged, high capacity load cell by utilizing a new type of active element rather than the hollow core loaded beam and column load cell presently utilized.

While the foregoing description of the cylindrical embodiment utilizes a disc bounded by two pairs of holes and two pairs of slots, it is recognized that many variations and modifications may be made therein without departing from the scope of the present invention as set forth in the claims.

I claim:

1. A load cell formed as an integral unitary structure for measuring axially applied loads which comprises
    (a) a body of resilient material having first and second ends and containing an axis extending therebetween in the direction of the applied load;
    (b) a first pair of spaced diametrical openings located within said body and residing within a first plane, perpendicular to said axis said openings being orthogonal one to the other;
    (c) a first pair of opposing slots interconnecting adjacent openings of said first pair and extending inwardly to said axis;
    (d) a second pair of diametrical openings located within said body and residing within a second plane, perpendicular to said axis said openings being orthogonal one to the other, said second plane being axially spaced from said first plane;
    (e) a second pair of opposing slots interconnecting adjacent openings of said second pair and extending inwardly to said axis, said second pair of slots being rotated about said axis from said first pair of slots, and
    (f) means for sensing strain induced in the peripheral surface of said load cell.

2. The load cell of claim 1 wherein said means for sensing strain induced in the peripheral surface of said load cell comprises strain gage means mounted on the outer surface of said cylindrical body and located between adjacent openings in said first and second planes.

3. The load cell of claim 1 wherein the slots of the first and second pairs have an arcuate length which does not exceed ninety degrees, said pairs having a relative rotation therebetween of ninety degrees about said axis.

4. The load cell of claim 1 wherein the slots of said first and second pairs are rotationally oriented about said axis so as to prevent overlap in the axial direction.

5. The load cell of claim 4 further including a load receiving surface integral with said first end and a basal surface integral with said second end.

6. In a load cell of the type wherein strain responsive means is located on the outer surface thereof to indicate the magnitude of an applied axial load, the improvement which comprises:
    (a) a disc-shaped measuring body through which the axis of the applied load extends, said body having first and second opposing surfaces orthogonal to said axis;
    (b) said first surface having at least two diametrically opposed raised portions thereon which extend inwardly toward said axis;
    (c) said second surface having at least two diametrically opposed raised portions thereon which extend inwardly toward said axis, the raised portions of said second surface being rotated about said axis with respect to the raised portions of said first surface;
    (d) means for applying a load to the disc-shaped measuring body on the opposed raised portions on the first surface;
    (e) means for supporting the disc-shaped measuring body on the opposed raised portions on the second surface; and
    (f) the applied load causing a strain in the outer surface of the disc-shaped measuring body, said strain being sensed by strain responsive means located on said outer surface.

7. The improvement of claim 6 wherein the raised portions of said first and second surfaces are arcuate segments.

8. The improvement of claim 7 wherein the raised portions of said first and second surfaces are integral with a load receiving member and a basal support member respectively.

9. The improvement of claim 8 wherein said first and second surfaces each include a pair of orthogonal depressions extending thereacross through said axis, each of said pair of depressions being aligned with the pair on the opposing surface whereby the raised portions of said surfaces are thereby spaced from each other.

* * * * *